(12) United States Patent
Cho (10) Patent No.: US 8,210,733 B2
(45) Date of Patent: Jul. 3, 2012

(54) LIGHTING DEVICE FOR DISPLAY DEVICE AND DISPLAY DEVICE

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 487 days.

(21) Appl. No.: 12/524,163

(22) PCT Filed: Nov. 21, 2007

(86) PCT No.: PCT/JP2007/072535
§ 371 (c)(1),
(2), (4) Date: Jul. 23, 2009

(87) PCT Pub. No.: WO2008/111262
PCT Pub. Date: Sep. 18, 2008

(65) Prior Publication Data
US 2010/0110663 A1    May 6, 2010

(30) Foreign Application Priority Data

Mar. 9, 2007  (JP) ................................ 2007-060386

(51) Int. Cl.
*F21V 7/04* (2006.01)
(52) U.S. Cl. .................. 362/633; 362/97.2; 362/217.11; 362/217.12; 362/613
(58) Field of Classification Search .................. 362/611, 362/613–614, 632–634, 97.1, 97.2, 217.1–217.13; 349/58, 86
See application file for complete search history.

(56) References Cited

U.S. PATENT DOCUMENTS

| 5,560,698 | A | 10/1996 | Okano |
| 2004/0183959 | A1* | 9/2004 | Ishida ............................. 349/58 |
| 2006/0044780 | A1 | 3/2006 | Kim |
| 2006/0103774 | A1* | 5/2006 | Han et al. ........................ 349/58 |
| 2007/0058108 | A1* | 3/2007 | Uehara et al. .................. 349/86 |

FOREIGN PATENT DOCUMENTS

| JP | 2004-220980 A | 8/2004 |
| JP | 2006-066360 A | 3/2006 |

OTHER PUBLICATIONS

Official Communication issued in International Patent Application No. PCT/JP2007/072535, mailed on Dec. 18, 2007.
Cho; "Lighting Device for Display Device and Display Device"; U.S. Appl. No. 12/524,173, filed Jul. 23, 2009.
Cho; "Lighting Device for Display Device and Display Device"; U.S. Appl. No. 12/524,174, filed Jul. 23, 2009.
Cho; "Lighting Device for Display Device and Display Device"; U.S. Appl. No. 12/524,178, filed Jul. 23, 2009.

* cited by examiner

*Primary Examiner* — Stephen F Husar
*Assistant Examiner* — Meghan Dunwiddie
(74) *Attorney, Agent, or Firm* — Keating & Bennett, LLP (57) ABSTRACT

A lighting device for a display device includes a light source and a chassis arranged to cover the light source. The chassis includes a base member made of resin material, and further includes a metallic skeleton frame provided on the base member. Thus, the lighting device for a display device having a simple construction capable of preventing or suppressing beat tones generated on a lamp housing member is provided without increasing the thickness of the device.

13 Claims, 8 Drawing Sheets

LIGHTING DEVICE FOR DISPLAY DEVICE AND DISPLAY DEVICE

BACKGROUND OF THE INVENTION

1. Field of the Invention

The present invention relates to a lighting device for a display device and a display device including a lighting device.

2. Description of the Related Art

In a display device having non-luminous optical elements as typified by a liquid crystal display device, a backlight device is provided on the backside of a display panel such as a liquid crystal panel, so as to illuminate the display panel (as shown in JP-A-2006-66360, for example).

JP-A-2006-66360 discloses a backlight assembly that includes lamps and a housing member for holding the lamps. In the backlight assembly thus including lamps and a housing member for holding the lamps, beat tones may be generated during dimming control of the lamps, due to the second and third harmonics of a dimming control frequency.

There are various theories as to how the beat tones are generated. For example, one of the theories suggests involvement of current leakage from the lamps to the housing member. That is, the beat tones may be generated by vibration of the housing member caused by leakage current from the lamps.

JP-A-2006-66360 discloses that bulging portions or recessed portions corresponding to the lamps are formed on the housing member in order to prevent current leakage between the lamps and the housing member. However, the beat tones cannot be reduced adequately even according to this construction. Moreover, if bulging or recessed portions are provided, the housing member may be prone to having increased thickness due to the bulging or recessed portions. This is a significant problem where thinning of liquid crystal display devices is required.

SUMMARY OF THE INVENTION

Accordingly, preferred embodiments of the present invention provide a lighting device for a display device capable of preventing or suppressing beat tones generated on a lamp housing member, without increasing the thickness of the device and with a simple structure. In addition, preferred embodiments of the present invention provide a high-quality and highly-reliable display device including the lighting device.

A lighting device for a display device according to a preferred embodiment of the present invention includes a light source and a chassis arranged to cover the light source, in which the chassis includes a base member made of resin material and a metallic skeleton frame provided on the base member.

The inventor of the present application has repeatedly considered measures for beat tones, and consequently the beat tones can be substantially eliminated when the chassis includes a base member made of resin. This may be due to major reduction of current leakage from the light source to the chassis. That is, the chassis, defined by a base member made of poorly conductive resin is less subject to current leakage from the light source to the chassis. Accordingly, the chassis is less likely to generate beat tones.

Particularly, the chassis defined by a resin base member, may result in strength reduction of the chassis. In view of this, according to a preferred embodiment of the present invention, the metallic skeleton frame is provided on the resin base member, so that strength reduction can be prevented.

Moreover, if a chassis is still formed solely of a resin base member, the lighting performance of the light source may be reduced or the voltage value required for lighting may be increased, compared to a conventional metallic chassis. That is, in the case of a conventional metallic chassis, the use of leakage to the chassis at the time of lighting the light source enables the reduced lighting voltage of the light source.

In contrast, the chassis including a resin base member is less prone to the above leakage capable of being used for improving the lighting performance. In view of this, according to a preferred embodiment of the present invention, the metallic skeleton frame is preferably provided on the resin chassis. Thereby, the slight leakage required for improving the lighting performance can be maintained, while a large amount of leakage current and the consequent beat tones are prevented. Thus, the present construction enables the reduced lighting voltage of the light source, as in a construction including a conventional metallic chassis.

The provision of the metallic skeleton frame will not result in generating beat tones. This may be because the metallic skeleton frame is less subject to current leakage, compared to a chassis formed of a metal plate or base member. Further, vibration of the skeleton frame, if any, hardly contributes to generating beat tones. That is, the plate-like shape of a member may contribute to beat tones generated thereon, and therefore the metallic skeleton frame cannot generate beat tones even when it is vibrating. Note that the current amount "I" of the leakage from the light source to the metallic skeleton frame can be expressed by the following formula (1):

$$I = 2\pi f \epsilon CV = 2\pi f \epsilon (S/d) V \qquad \text{formula (1)}$$

where "I" is the amount of leakage current, "C" is the stray capacitance, "V" is the potential difference between the light source and the metallic skeleton frame, "S" is the area of the metallic skeleton frame, and "d" is the distance between the light source and the metallic skeleton frame. In contrast to a plate-shaped member or metal plate, the area "S" of the metallic skeleton frame can be extremely small, and therefore the amount of leakage current can be also extremely small.

JP-A-2006-66360 discloses a construction, also as a measure against the current leakage, in which bulging portions or recessed portions corresponding to the lamps or light sources are formed on the housing member or chassis. However, the beat tones cannot be sufficiently eliminated when the bulging or recessed portions are provided as a measure for beat tones. This may be because the slightly longer distance between the light sources and the chassis caused by the bulging or recessed portions fails to result in sufficient elimination of the beat tones.

In contrast, the base member made of resin can result in the effect of adequately preventing the beat tones. Particularly, the construction of preferred embodiments of the present invention contributes greatly to reduction in size of the present lighting device for a display device, because bulges on the chassis, which are generated due to the bulging or recessed portions as in JP-A-2006-66360, are prevented.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be hereinafter explained with reference to the drawings.

Figure 1:
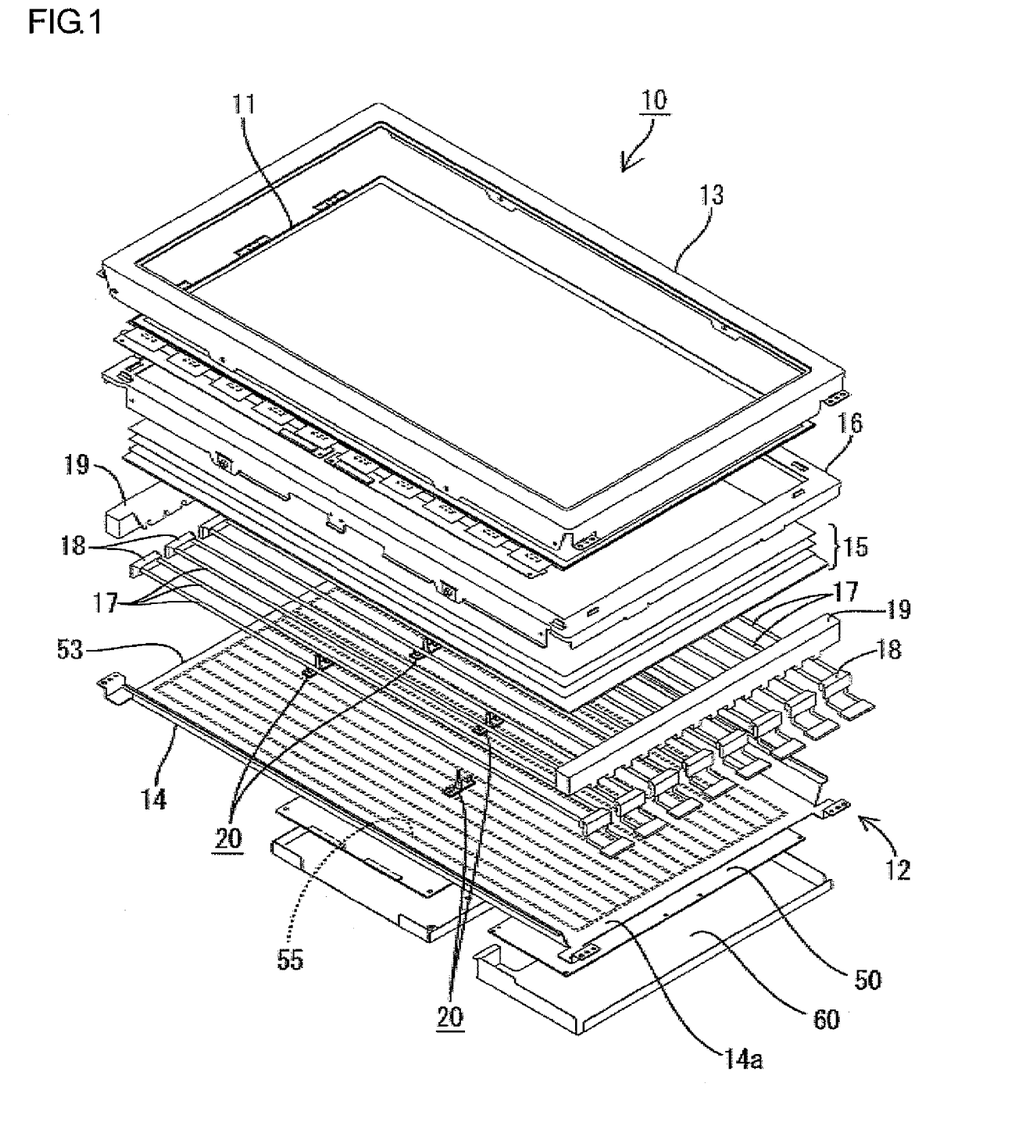
FIG. 1 is an exploded perspective view showing the general construction of a liquid crystal display device according to a preferred embodiment of the present invention.
Figure 2:
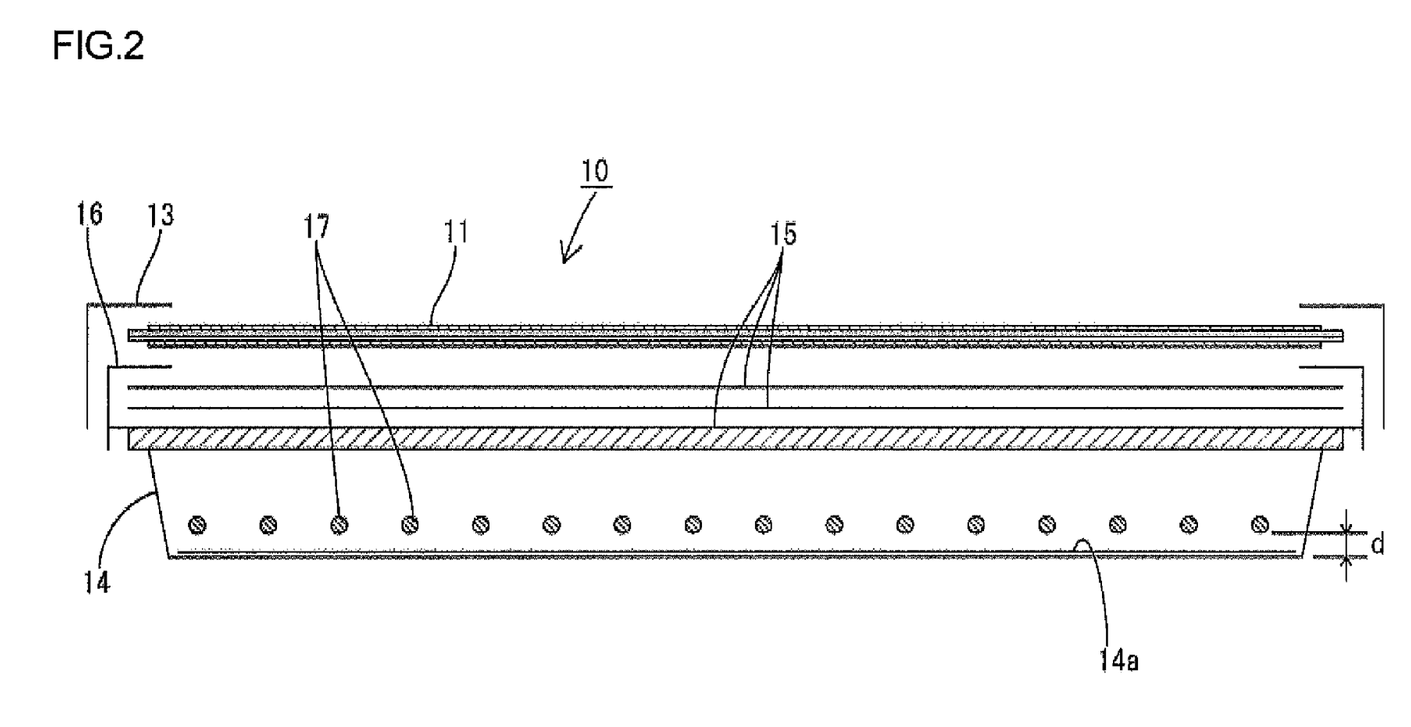
FIG. 2 is a sectional view of the liquid crystal display device shown in FIG. 1.
Figure 3:
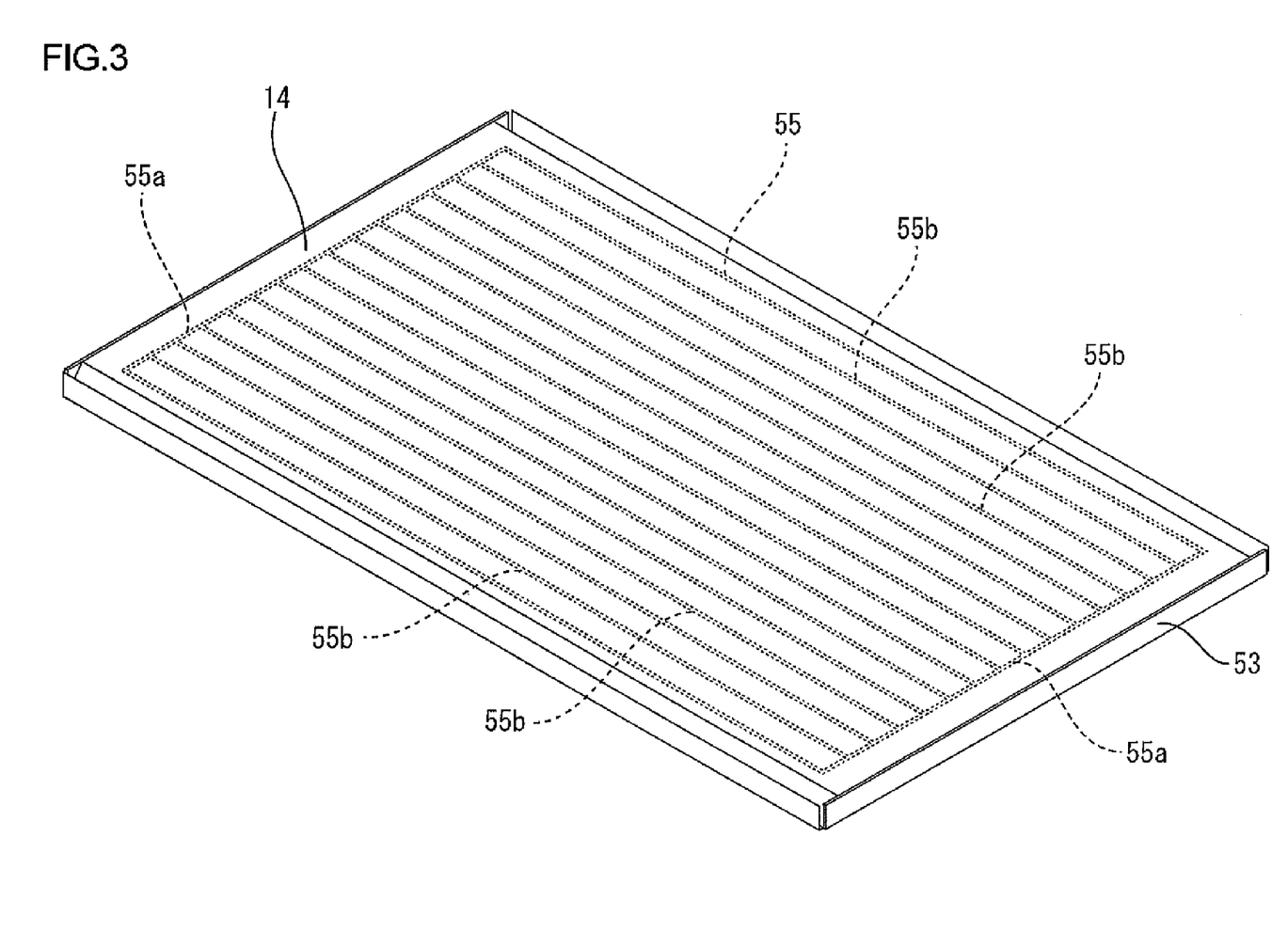
FIG. 3 is a perspective view showing the general construction of a chassis included in the liquid crystal display device shown in FIG. 1.
Figure 4:
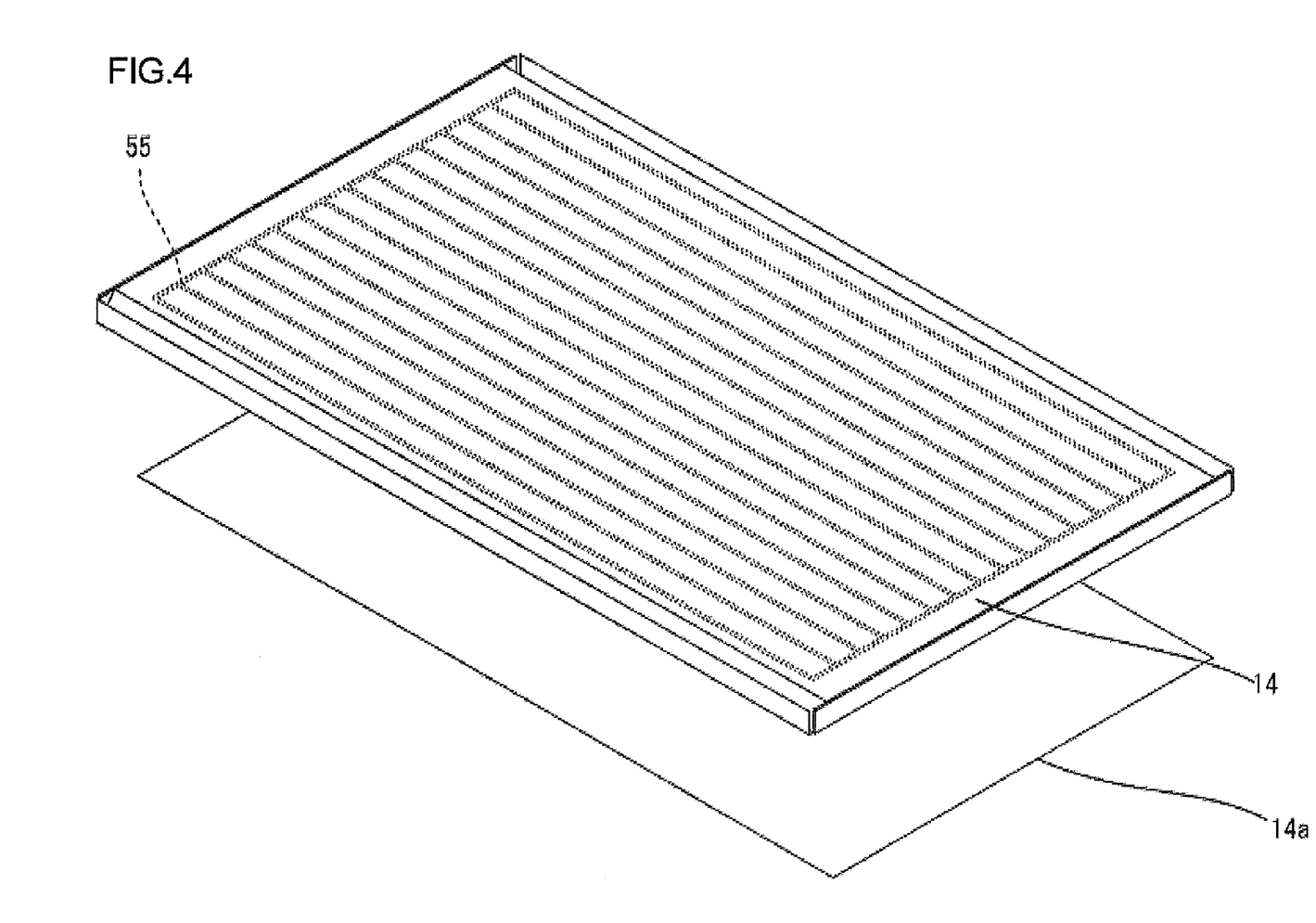
FIG. 4 is a perspective view separately showing a sheet and the like to be attached to the chassis.
Figure 5:
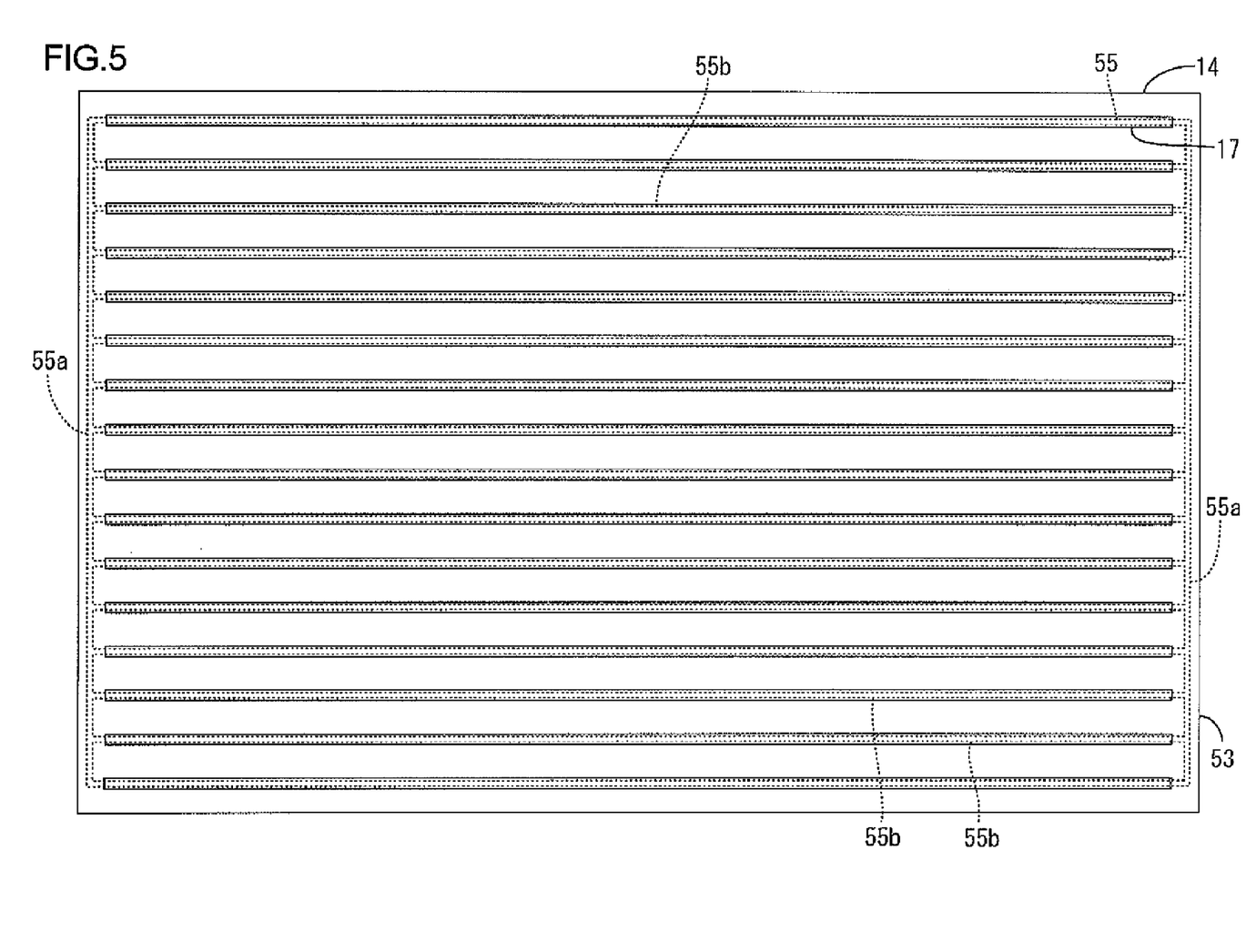
FIG. 5 is a plan view showing the general construction of the chassis.
Figure 6:
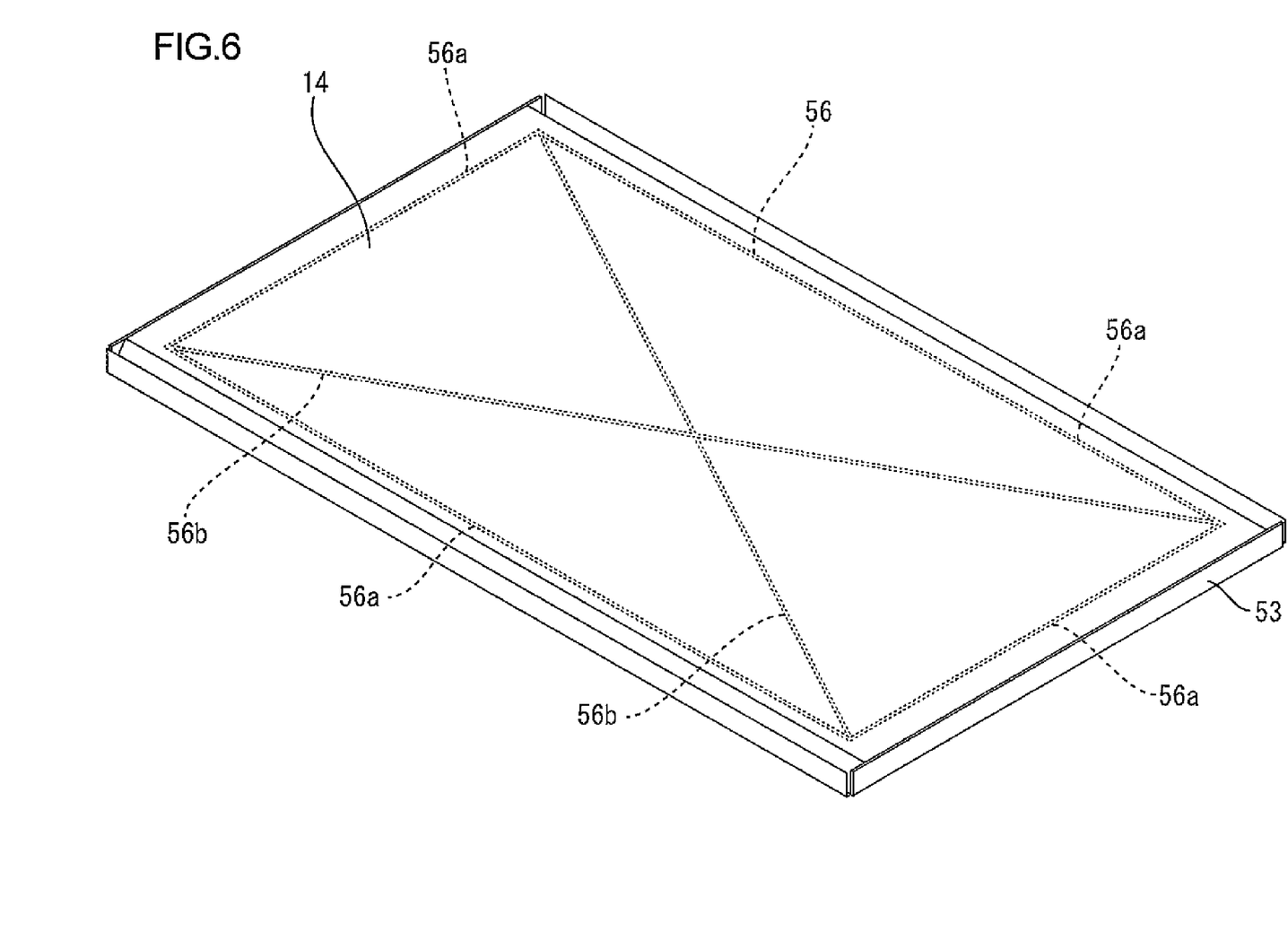
FIG. 6 is a perspective view showing the general construction of a modification of the chassis.
Figure 7:
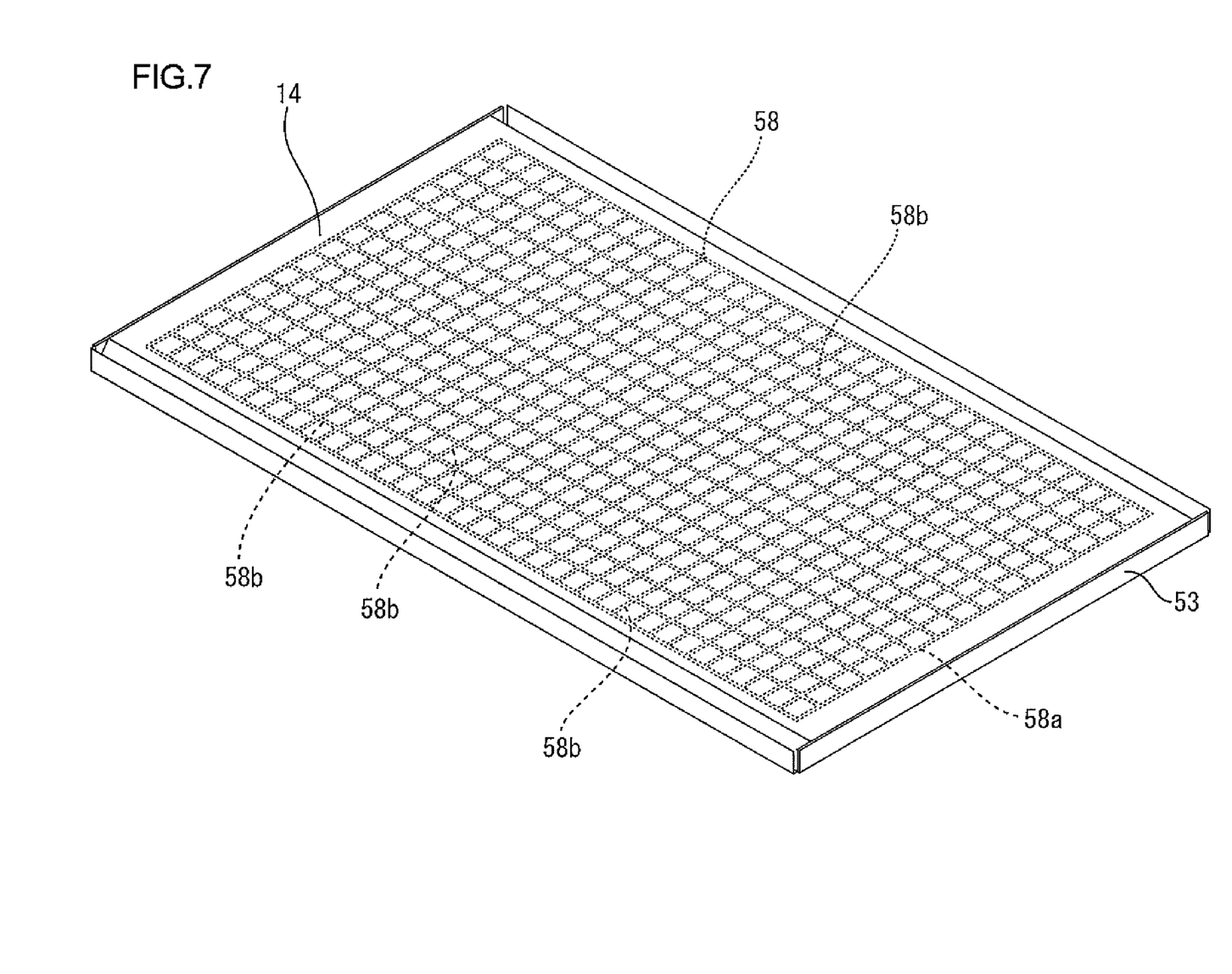
FIG. 7 is a perspective view showing the general construction of a modification of the chassis.
Figure 8:
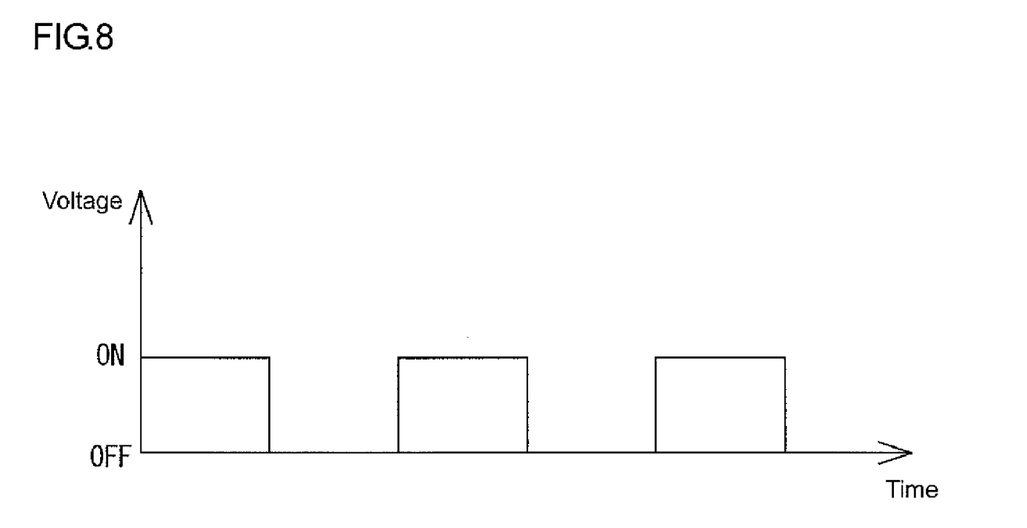
FIG. 8 is an explanatory diagram showing a driving scheme for cold cathode tubes, which is applied to the liquid crystal display device shown in FIG. 1.

FIG. 1 is an exploded perspective view showing the general construction of a liquid crystal display device according to a preferred embodiment of the present invention. FIG. 2 is a sectional view showing the general construction of the liquid crystal display device. FIG. 3 is a perspective view showing the general construction of a chassis or backlight chassis included in the liquid crystal display device of the present preferred embodiment. FIG. 4 is a perspective view separately showing the chassis and a sheet to be attached to the chassis. FIG. 5 is a plan view showing the relative arrangement of the chassis and light sources or cold cathode tubes. FIGS. 6 and 7 are each an exploded perspective view showing the general construction of a modification of the chassis. FIG. 8 is an explanatory diagram showing a driving scheme for cold cathode tubes, which is applied to the liquid crystal display device shown in FIG. 1.

The general construction of the liquid crystal display device 10 according to the present preferred embodiment will be explained first. Referring to FIGS. 1 and 2, the liquid crystal display device 10 includes a liquid crystal panel 11 having a rectangular or substantially rectangular shape, and a backlight device 12 (lighting device for a display device) as an external light source, which are integrally held by a bezel 13 and the like. The liquid crystal panel 11 includes a pair of glass substrates, which are attached to each other so as to face each other while a gap of a predetermined size is kept therebetween. Liquid crystal is sealed between the glass substrates. On one of the glass substrates, components such as switching elements (e.g., TFTs) connected to source wiring lines and gate wiring lines running at right angles to each other, and pixel electrodes connected to the switching elements are provided. On the other of the glass substrates, components such as a counter electrode, a color filter having R, G, and B color sections arranged in a predetermined pattern are provided.

Next, the backlight device 12 will be explained. The backlight device 12 preferably is a so-called direct-light type backlight device that includes a plurality of linear light sources (e.g., cold cathode tubes (tubular light sources) 17 as high-pressure discharge tubes, in the present preferred embodiment), which are positioned directly below the back surface of the liquid crystal panel 11 (i.e., the panel surface on the opposite side of the display side), and are arranged along the panel surface.

The backlight device 12 includes a backlight chassis (hereinafter, referred to simply as the chassis) 14 having a substantially box-like shape with an opening on its upper side, and a plurality of optical members 15 (e.g., a diffuser plate, a diffusing sheet, a lens sheet and an optical sheet, in order from the lower side of the figure) which are arranged to cover in the opening of the chassis 14. Further included are a frame 16 arranged to hold the optical members 15 on the chassis 14, cold cathode tubes (or light sources) 17 contained in the chassis 14, rubber (e.g., silicon rubber) holders 18 arranged to hold the end portions of the cold cathode tubes 17, lamp holders 19 arranged to collectively cover the cold cathode tubes 17 and the holders 18, and lamp clips 20 arranged to mount and hold the cold cathode tubes 17 on the chassis 14. Note that the optical member 15 side of the cold cathode tubes 17 corresponds to the light emitting side of the backlight device 12.

Each of the cold cathode tubes 17 preferably defines a tubular shape elongated in one direction. A number (e.g., sixteen in FIG. 1) of cold cathode tubes 17 are contained in the backlight chassis 14 so that the longitudinal direction (or axial direction) thereof conforms with the long-side direction of the backlight chassis 14. On the other hand, the lamp clips 20, arranged to mount the cold cathode tubes 17 to the backlight chassis 14, function as clip members for holding light sources, and are preferably made of synthetic resin (e.g., polycarbonate). The plurality of lamp clips 20 are mounted on the backlight chassis 14 so as to support each of the cold cathode tubes 17 at two or three points spaced along the longitudinal direction thereof.

The backlight chassis 14 having a substantially box-like shape includes a plate-shaped member or base member 53 made of resin, and further includes a metallic skeleton frame 55 buried in the plate-shaped member.

The plate-shaped member 53 is preferably formed of a general-purpose resin with high mechanical strength, such as polycarbonate, ABS, MS or PET resin or FRP, and has a function of covering and protecting the cold cathode tubes 17.

The metallic skeleton frame 55 is preferably formed of linear members or wires made of a metallic material such as aluminum, iron or one of various alloyed metals, and functions as a reinforcing member for the backlight chassis 14 and as a member for improving the lighting performance of the cold cathode tubes 17. That is, the resin plate-shaped member 53 when with no additional member may be insufficient in strength for use as the chassis, and therefore is thus reinforced. The skeleton frame 55 is thus provided, also because the resin plate-shaped member 53 when with no additional member may fail to provide an effect of improving the lighting performance (or, an effect of reducing the lighting voltage) that can be obtained by taking advantage of leakage from the cold cathode tubes 17. Note that the leakage from the cold cathode tubes 17 to the skeleton frame 55 can hardly contribute to generating beat tones as described below.

Referring to FIGS. 3 and 5, the metallic skeleton frame 55 includes outer end portions 55a arranged on end portions of the plate-shaped member 53, and further includes bridge portions 55b arranged on the medial area of the plate-shaped member 53. Specifically, the bridge portions 55b of the skeleton frame 55 are arranged directly below the cold cathode tubes 17, so as to define a striped configuration formed of strips along the cold cathode tubes 17, in the present preferred embodiment. The outer diameter of each cold cathode tube 17 is preferably between about 3.4 mm and about 4.0 mm, while the wire diameter of the metallic skeleton frame 55 is preferably between about 2.0 mm and about 5.0 mm for example.

A light reflecting sheet 14a is provided on the inner surface side (light source side) of the backlight chassis 14, which forms a light reflecting surface. The backlight chassis 14 thus includes the light reflecting sheet 14a, and thereby the light from the cold cathode tubes 17 can be reflected to the optical members 15 such as the diffuser plate (hereinafter, sometimes referred to as "the diffuser plate 15 and the like"). The light reflecting sheet 14a can be formed of a resin sheet having light reflectivity, for example. The light reflecting sheet 14a is unnecessary in some cases, such as when the resin plate-shaped member of the backlight chassis 14 is formed of a light reflective member. The skeleton frame 55 is buried in the plate-shaped member 53, and therefore is shown by broken lines in the drawings.

An inverter board 50 arranged to supply a drive voltage to the cold cathode tubes 17 is mounted to the backlight chassis 14, or specifically, mounted on the opposite side of the cold cathode tubes 17 (i.e., on the opposite side of the light emitting surface). The inverter board 50 includes an inverter circuit that generates a high-frequency voltage for lighting the cold cathode tubes 17. Specifically, in the present preferred embodiment, the inverter circuit is connected to one of two end portions of each cold cathode tube 17, and therefore the one end portion is subjected to high voltage during lighting. Referring to FIG. 8, in the present preferred embodiment, the cold cathode tubes 17 are driven by pulse-width modulation (PWM), for example. Thereby, the dimming control is performed in a predetermined cycle.

The liquid crystal display device 10 thus constructed according to the present preferred embodiment can provide the following operational effects.

In the liquid crystal display device 10 of the present preferred embodiment, the chassis 14 of the backlight device 12 preferably includes a plate-shaped member 53 made of resin and a metallic skeleton frame 55 buried in the plate-shaped member 53. According to the construction, the chassis 14 is less likely to generate beat tones, which can be caused by its vibration. The beat tones may be thus generated on the chassis 14 due to vibration of the chassis 14. The vibration may result from various factors, and the factors include current leakage from the cold cathode tubes 17 to the chassis 14.

A conventional chassis is preferably formed of a conductive metal plate in most cases. In this case, a capacitor may be formed between the cold cathode tube and the metallic chassis, resulting in current leakage from the cold cathode tubes to the metallic chassis. A force acting on the metallic chassis can be generated due to the leakage current, which causes the metallic chassis to vibrate resulting in beat tones. Particularly, in the case of pulse-width modulation, the leakage current can be periodic, and therefore a periodic force acts on the metallic chassis so as to generate beat tones. In contrast, according to the present preferred embodiment, the chassis 14 is preferably defined by a plate-shaped member 53 made of resin, and thereby the possibility of the above current leakage from the cold cathode tubes 17 to the chassis 14 is minimized. Consequently, beat tones can be prevented or suppressed.

The chassis 14 defined by a resin plate-shaped member 53, may result in strength reduction of the chassis 14. In view of this, according to the present preferred embodiment, the metallic skeleton frame 55 is provided on the resin plate-shaped member 53, so that the above strength reduction can be prevented.

Further, in the present preferred embodiment, the metallic skeleton frame 55 provided on the resin plate-shaped member 53 can cause current leakage from the cold cathode tubes 17 to the skeleton frame 55. By utilizing the leakage current or the leakage, the lighting performance can be improved. That is, the use of the leakage from the cold cathode tubes 17 to the skeleton frame 55 enables the reduced lighting voltage of the cold cathode tubes 17.

The current leakage to the skeleton frame 55 is not large in current amount, and therefore will not cause beat tones to be generated on the chassis 14. Even if the skeleton frame 55 vibrates due to the current leakage, beat tones will not be generated because it does not have a plate-like shape. The current amount "I" of the leakage from the cold cathode tubes 17 to the skeleton frame 55 can be expressed by the following formula (1):

$$I = 2\pi f \epsilon CV = 2\pi f \epsilon (S/d) V \qquad \text{formula (1)}$$

where "I" is the amount of leakage current, "C" is the stray capacitance, "V" is the potential difference between the cold cathode tubes 17 and the metallic skeleton frame 55, "S" is the area of the metallic skeleton frame 55, and "d" is the distance between the cold cathode tubes 17 and the metallic skeleton frame 55. In contrast to a plate-shaped member (or metal plate), the area "S" of the metallic skeleton frame 55 can be extremely small, and therefore the amount of leakage current can be also extremely small. For this reason, beat tones can be prevented even when the skeleton frame 55 is provided.

Shown above is a preferred embodiment of the present invention. However, the present invention is not limited to the preferred embodiment explained in the above description made with reference to the drawings. The following preferred embodiments may be included in the technical scope of the present invention, for example, and further the present invention may be embodied in various forms without departing from the scope of the invention.

In the liquid crystal display device 10 shown in FIG. 1, the skeleton frame 55 is arranged to define a striped configuration formed of strips along the cold cathode tubes 17. However, a skeleton frame 56 shown in FIG. 6 may be provided instead, for example. In FIG. 6, the skeleton frame 56 buried in the plate-shaped member 53 of the chassis 14 includes border portions or outer end portions 56a arranged along the outline or outer shape of the resin plate-shaped member 53, and further includes bridge portions 56b provided as diagonal bridges across the inside of the border portions 56a. According to the construction, beat tones can be also prevented or suppressed while the chassis 14 is provided with sufficient strength.

Alternatively, a skeleton frame 58 shown in FIG. 7 may be provided. In FIG. 7, the skeleton frame 58 buried in the plate-shaped member 53 of the chassis 14 includes border portions or outer end portions 58a arranged along the outline or outer shape of the resin plate-shaped member 53, and further includes bridge portions 58b provided as networked bridges across the inside of the border portions 58a. Specifically, the bridge portions 58b extending in the long-side direction of the chassis 14 are arranged along the cold cathode tubes 17 so as to define a striped configuration which contributes to the above effect of improving the lighting performance. The bridge portions 58b extending in the short-side direction of the chassis 14 contribute to the effect of reinforcing the chassis 14. According to the construction, beat tones can be also prevented or suppressed while the chassis 14 is provided with sufficient strength.

In the above preferred embodiment, cold cathode tubes 17 are preferably used as light sources. However, the present invention can include a construction in which another type of light sources such as hot cathode tubes is used, for example.

Further, in the above preferred embodiment, the backlight device, in which one end portion of each cold cathode tube 17 is arranged to be subjected to high voltage, is shown for illustrative purposes. However, the above construction can be employed on a backlight device 12 in which both end portions of each cold cathode tube 17 are arranged to be subjected to high voltage.

In the above preferred embodiment, TFTs are preferably used as switching elements of the liquid crystal display device. However, the present invention can be applied to a liquid crystal display device that uses another type of switching elements than TFTs (e.g., thin-film diodes (TFDs)). Further, the present invention can be applied to a liquid crystal display device for monochrome display, as well as a liquid crystal display device capable of color display.

Moreover, although a liquid crystal display device is shown in the above preferred embodiment, the present invention can be applied to other types of display devices than a liquid crystal type, which use a backlight device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A lighting device for a display device, comprising:
   a light source; and
   a chassis arranged to cover said light source; wherein
   said chassis includes a base member made of resin material and a metallic skeleton frame provided on said base member; and
   said metallic skeleton frame includes an outer end portion arranged on an end portion of said base member, and further includes a bridge portion arrange to define a bridge across an inside of said outer end portion.

2. A lighting device for a display device, as in claim 1, wherein said metallic skeleton frame is buried in said base member.

3. A lighting device for a display device, as in claim 1, wherein said metallic skeleton frame is at least arranged to be located directly below said light source.

4. A lighting device for a display device, as in claim 1, wherein:
   said light source includes linear light sources arranged to form a striped configuration; and
   said metallic skeleton frame is at least arranged to form a striped configuration including strips along said linear light sources.

5. A lighting device for a display device, as in claim 1, wherein said light source is arranged to be driven by pulse-width modulation.

6. A display device comprising:
   a lighting device for a display device, as in claim 1; and
   a display panel for providing display by use of light from said lighting device for a display device.

7. A display device as in claim 6, wherein said display panel is a liquid crystal panel that uses liquid crystal.

8. A lighting device for a display device, comprising:
   a light source; and
   a chassis arranged to cover said light source; wherein
   said chassis includes a base member made of resin material and a metallic skeleton frame provided on said base member;
   said light source includes linear light sources arranged to form a striped configuration; and
   said metallic skeleton frame is at least arranged to form a striped configuration including strips along said linear light sources.

9. A lighting device for a display device, as in claim 8, wherein said metallic skeleton frame is buried in said base member.

10. A lighting device for a display device, as in claim 8, wherein said metallic skeleton frame is at least arranged to be located directly below said light source.

11. A lighting device for a display device, as in claim 8, wherein said light source is arranged to be driven by pulse-width modulation.

12. A display device comprising:
    a lighting device for a display device, as in claim 8; and
    a display panel for providing display by use of light from said lighting device for a display device.

13. A display device as in claim 12, wherein said display panel is a liquid crystal panel that uses liquid crystal.

* * * * *